United States Patent
Hiromi et al.

(12)

(10) Patent No.: US 10,091,704 B2
(45) Date of Patent: Oct. 2, 2018

(54) RADIO COMMUNICATION SYSTEM AND RADIO BASE STATION

(71) Applicant: MURATA MACHINERY, LTD., Kyoto-shi, Kyoto (JP)

(72) Inventors: Akinori Hiromi, Kyoto (JP); Yoshifumi Tanimoto, Kyoto (JP); Kazutoshi Takata, Soraku-gun (JP); Tetsuya Kuwana, Soraku-gun (JP)

(73) Assignee: MURATA MACHINERY, LTD., Kyoto (JP)

( * ) Notice: Subject to any disclaimer, the term of this patent is extended or adjusted under 35 U.S.C. 154(b) by 32 days.

(21) Appl. No.: 15/504,707

(22) PCT Filed: Jun. 17, 2015

(86) PCT No.: PCT/JP2015/003036
§ 371 (c)(1),
(2) Date: Feb. 17, 2017

(87) PCT Pub. No.: WO2016/027395
PCT Pub. Date: Feb. 25, 2016

(65) Prior Publication Data
US 2017/0273001 A1    Sep. 21, 2017

(30) Foreign Application Priority Data
Aug. 19, 2014  (JP) .................................. 2014-166870

(51) Int. Cl.
*H04W 40/22* (2009.01)
*H04L 12/44* (2006.01)
(Continued)

(52) U.S. Cl.
CPC ............. *H04W 40/22* (2013.01); *H04L 12/44* (2013.01); *H04W 76/023* (2013.01);
(Continued)

(58) Field of Classification Search
CPC ... H04W 40/22; H04W 76/023; H04W 76/14; H04L 12/44
See application file for complete search history.

(56) References Cited

U.S. PATENT DOCUMENTS

| | | | |
|---|---|---|---|
| 7,349,360 B2 * | 3/2008 | Gutierrez | ............... H04L 45/00 370/315 |
| 2007/0198656 A1 * | 8/2007 | Mazzaferri | ........... G06F 3/1415 709/218 |

(Continued)

FOREIGN PATENT DOCUMENTS

| | | |
|---|---|---|
| JP | 2007-201782 A | 8/2007 |
| JP | 2009-302694 A | 12/2009 |
| WO | 2008/004066 A2 | 1/2008 |

OTHER PUBLICATIONS

Official Communication issued in International Patent Application No. PCT/JP2015/003036, dated Aug. 25, 2015.

*Primary Examiner* — Asad Nawaz
*Assistant Examiner* — Syed S Ali
(74) *Attorney, Agent, or Firm* — Keating & Bennett, LLP

(57) ABSTRACT

A radio communication system includes a first radio base station including a terminal communicator which communicates with a radio terminal and a connection timing controller which starts waiting for connection in station-to-station communication when the terminal communicator has established a communication link with the radio terminal, a second radio base station including a connector which, upon detecting the base station waiting for connection in station-to-station communication, establishes connection with the base station in the station-to-station communication and a connection timing controller which, when the connector has detected the base station, starts waiting for connection in station-to-station communication, and a third radio base station including a connector which, upon detecting the base (Continued)

station waiting for connection in station-to-station communication, establishes connection with the second base station in the station-to-station communication. The second base station further includes a relay which relays communication between the first base station and the third base station.

6 Claims, 13 Drawing Sheets

(51) Int. Cl.
  *H04W 76/02* (2009.01)
  *H04W 76/14* (2018.01)
  *H04W 84/12* (2009.01)
  *H04W 88/04* (2009.01)
  *H04W 84/18* (2009.01)
(52) U.S. Cl.
  CPC ............ *H04W 76/14* (2018.02); *H04W 84/12* (2013.01); *H04W 84/18* (2013.01); *H04W 88/04* (2013.01)

(56) References Cited

U.S. PATENT DOCUMENTS

| | | | |
|---|---|---|---|
| 2010/0153770 A1* | 6/2010 | Lee | G08B 13/19656 714/4.1 |
| 2010/0260146 A1* | 10/2010 | Lu | H04L 12/4633 370/331 |
| 2012/0263035 A1* | 10/2012 | Nakanishi | H04L 45/02 370/225 |
| 2014/0057670 A1* | 2/2014 | Lim | H04W 8/005 455/509 |
| 2015/0215201 A1* | 7/2015 | Nakash | H04L 45/28 370/218 |
| 2015/0244602 A1* | 8/2015 | Hasha | H04L 67/1095 709/224 |
| 2016/0119229 A1* | 4/2016 | Zhou | H04L 12/4633 370/392 |
| 2016/0135242 A1* | 5/2016 | Hampel | H04W 40/02 370/329 |

\* cited by examiner

FIG. 5A  501

| Root address | Sender address | The number of hops |

FIG. 5B  502

| MAC_A | 1 |

FIG. 5C  503

| MAC_A | MAC_B | 2 |

| To DS | From DS | Add1 | Add2 | Add3 | Add4 |
|-------|---------|------|------|------|------|
| 1 | 1 | AP2 | AP1 | STA2 | STA1 |

RADIO COMMUNICATION SYSTEM AND RADIO BASE STATION

BACKGROUND OF THE INVENTION

1. Field of the Invention

The present invention relates to a radio communication system and radio base stations.

2. Description of the Related Art

Techniques for providing nodes in radio networks with relay functions to configure mesh networks or tree networks have been known. The mesh networks etc. vary depending on use thereof, and include ones which are always maintained, ones which are configured when necessary, etc.

Recently, radio terminals (mobile phone terminals, smartphones, tablets, etc.) have been popular. There is a communication style for causing such a radio terminal to connect to one of nodes in a mesh network, and causing another one of the nodes in the mesh network and the radio terminal to send and receive data between them.

Japanese Unexamined Patent Application Publication No. 2009-302694 discloses a tree network which is configured using a radio gateway as a root.

In the tree network disclosed in Japanese Unexamined Patent Application Publication No. 2009-302694, the root is fixed to the radio gateway. This configuration in which the radio terminal can connect to any node, however, has a problem that it is impossible to configure an efficient network because connection of the radio terminal to a node other than the root prevents some nodes from communicating through the root. This configuration has another problem that an electricity to be consumed increases because it is necessary to keep communication for maintaining the communication path while the path in the network is being maintained.

SUMMARY OF THE INVENTION

Preferred embodiments of the present invention provide a radio communication system etc. which configures or provides a network in which radio terminals efficiently communicate with a base station. Preferred embodiments of the present invention further provide a radio communication system etc. which consumes reduced electricity to maintain a communication path.

A radio communication system according to a preferred embodiment of the present invention is a radio communication system including a plurality of radio base stations, wherein each of the plurality of radio base stations is capable of performing station-to-station communication with another radio base station included in the plurality of radio base stations, the plurality of radio base stations include a first base station, a second base station, and a third base station, the first base station includes a terminal communicator that communicates with a radio terminal; and a first connection timing controller that starts waiting for connection in station-to-station communication when the terminal communicator has established a communication link with the radio terminal, the second base station includes a first connector that, upon detecting the first base station which is waiting for connection in station-to-station communication among the plurality of radio base stations, establishes connection with the first base station in the station-to-station communication regarding the first base station as a communication partner, and a second connection timing controller that, when the first connector has detected the first base station, starts waiting for connection in station-to-station communication, and the third base station includes a second connector that, upon detecting the second base station which is waiting for connection in station-to-station communication among the plurality of radio base stations, establishes connection with the second base station in the station-to-station communication regarding the second base station as a communication partner; and the second base station further includes a first relay that relays communication with the first base station and the third base station.

In this way, triggered by the establishment of the communication link with the radio terminal, the radio communication system configures or provides a communication path by setting path information sequentially for a first base station, a second base station, and a third base station. In other words, the radio communication system dynamically configures or provides the communication path in which the radio base station to which the radio terminal connected becomes a root. In this way, the radio terminal is able to communicate with the third base station through relay by the first base station and the second base station. Here, since the shortest path from the radio terminal which established the communication link to the third base station which is the communication partner is triggered by the establishment of the communication link, the radio terminal and the base stations in the tree network are able to efficiently communicate with each other. In addition, no path search is required to maintain the connection in the network, which provides an advantage of being able to reduce electricity to be consumed in each base station.

In addition, the plurality of radio base stations may further include a fourth base station including a third connector that, upon detecting a radio base station which is waiting for connection in station-to-station communication among the plurality of radio base stations, establishes connection with a previous hop base station which is a detected radio base station in the station-to-station communication regarding the previous hop base station as a communication partner; a fourth connection timing controller that, upon detecting the previous hop base station, starts waiting for connection in station-to-station communication; and a second relay that, when a next hop base station which is a radio base station included in the plurality of radio base stations has started station-to-station communication with the third connector, relays communication between the radio terminal and the next hop base station.

In this way, the radio communication system is able to sequentially increase radio base stations capable of performing station-to-station communication by another radio base station establishing connection with a radio base station which is waiting in station-to-station communication. The radio base station which performs station-to-station communication is able to communicate with each radio terminal using relay of communication by the other radio base station. It is also possible to use relay of communication by the other radio base stations as a plurality of hops. In this way, the radio base station which cannot directly communicate with radio terminals can communicate with the radio terminals using the multi-hop relay of communication as necessary.

In addition, the first connection timing controller may, when the terminal communicator has disconnected the communication link with the radio terminal, stop waiting for connection in station-to-station communication, the first connector may, when the first connection timing controller has stopped waiting for connection in station-to-station communication, disconnect the connection in the station-to-station communication with the first base station, the second connection timing controller may, when the first connection timing controller has stopped waiting for connection in station-to-station communication, stop waiting for connection in station-to-station communication, and the second connector may, when the second connection timing controller has stopped waiting for connection in station-to-station communication, disconnect connection with the second base station in station-to-station communication.

In this way, the radio communication system cancels the communication path by cancelling path information in the first base station, the second base station, and the third base station which have been set, triggered by the disconnection of the communication link with the radio terminal. The disappearance of the communication link indicates that the communication partner was lost. A communication path which is not necessary anymore is cancelled at an appropriate timing by cancelling the communication path triggered by the disappearance of the communication link. In this way, when a communication path needs to be configured later, it is possible to newly configure an appropriate communication path in which the base station to which the radio terminal connected is a root.

In addition, the third connector may, when the previous hop base station has stopped waiting for connection in station-to-station communication, disconnect connection with the previous hop base station in station-to-station communication, and the fourth connection timing controller may, when the previous hop base station has stopped waiting for connection in station-to-station communication, stop waiting for connection in station-to-station communication.

In this way, the radio communication system cancels the communication path by cancelling the path information in the radio base station by sequentially stopping station-to-station communication by the radio base stations triggered by the disconnection of the communication link with the radio terminal. In this way, when a communication path needs to be configured later, it is possible to newly configure an appropriate communication path in which the base station to which the radio terminal connected is a root.

In addition, the terminal communicator may be capable of communicating with the plurality of radio terminals, and the first connection timing controller may, when the terminal communicator has established a communication link with each of the plurality of radio terminals and disconnected a communication link with a radio terminal included in the plurality of radio terminals, prevent stopping waiting for connection in station-to-station communication.

In this way, when the plurality of radio terminals have communication links with the radio base station, the radio communication system does not cancel the communication path as described above even when one of the communication links of the radio terminals is disconnected. In this way, the communication between the radio terminals which maintain the communication links and the radio base station is maintained.

In addition, a radio communication system according to a preferred embodiment of the present invention is a radio communication system, wherein the radio communication system includes a first radio communication system and a second radio communication system each of which is the radio communication system according to any of the preferred embodiments of the present invention described above, and the radio communication system is generated by merging the first and second radio communication systems with one of the first and second radio communication systems which is selected based on a predetermined condition.

In this way, when the plurality of radio communication systems are present and each can be connected to each other, these systems are merged into the single radio communication system. In this way, the radio terminals are able to communicate with a larger number of radio base stations.

In addition, a radio communication system according to a preferred embodiment of the present invention is a radio communication system including a plurality of radio base stations, wherein each of the plurality of radio base stations is capable of performing station-to-station communication which is communication with another of the plurality of radio base stations, and each of the plurality of radio base stations includes a terminal communicator that performs communication with a radio terminal, a connector that, upon detecting a radio base station which is waiting for connection in station-to-station communication among the plurality of radio base stations, establishes connection with a previous hop base station which is the detected radio base station in station-to-station communication regarding the previous hop base station as a communication partner; a connection timing controller that, when the terminal communicator has established a communication link with the radio terminal and when the connector has detected the previous hop base station, starts waiting for connection in station-to-station communication; and a relay that, when a next hop base station which is a radio base station included in the plurality of radio base stations has started station-to-station communication with the connector, relays communication between the radio terminal or the previous hop base station and the next hop base station.

In this way, the radio communication system provides similar effects to those of the earlier-described radio communication system.

In addition, when the communication link between the radio terminal and the terminal communicator is stopped, or when the station-to-station communication with the previous hop base station is stopped, each of the plurality of radio base stations may cause the connection timing controller to stop operating so as to stop station-to-station communication with the next hop base station.

In this way, a communication path which is not necessary anymore is cancelled at an appropriate timing by cancelling the communication path triggered by the disappearance of the communication link.

In addition, each of the plurality of radio base stations may not, when the communication link between the radio terminal and the terminal communicator is disconnected and another communication link is maintained between a terminal communicator of another of the radio base stations and another radio terminal, cause the connection timing controller to stop operating.

In this way, the communication path is maintained even when the communication link between the radio terminal and the radio base station is disconnected, as long as the other communication links are established between the other radio terminals and the other radio base stations.

In addition, a radio base station according to a preferred embodiment of the present invention includes a terminal communicator that communicates with a radio terminal, and a first connection timing controller that starts waiting for connection in station-to-station communication when the terminal communicator has established a communication link with the radio terminal.

In this way, the radio base station provides similar effects to the earlier-described radio communication system.

In addition, a radio base station according to a preferred embodiment of the present invention is a radio base station included in a plurality of radio base stations in a radio communication system, the radio base station including a connector that, upon detecting a previous hop base station, establishes connection with the previous hop station in station-to-station communication regarding the previous hop station as a communication partner, the previous hop station being a radio base station which is included in the plurality of radio base stations and is waiting for connection in the station-to-station communication, and a connection timing controller that starts waiting the connection in the station-to-station communication when the connector has detected the previous hop base station.

In this way, the radio base station provides similar effects to the earlier-described radio communication system.

In addition, the connector may, when the connector has detected two or more radio base stations which are waiting for connection in station-to-station communication among the two or more radio base stations, select a radio base station which is determined based on a predetermined condition among the detected plurality of radio base stations, and establish connection with the selected radio base station in station-to-station communication regarding the selected radio base station as the previous hop base station.

In this way, when there are a plurality of candidates for connection destinations in station-to-station communication, connection in station-to-station communication is established between an appropriate radio base station among the plurality of candidates. In this way, a more appropriate communication path is set for each radio base station. This reduces the possibility of occurrence of useless communication, resulting in reduction in electricity to be consumed.

In addition, the connector may, when the connector has searched the plurality of radio base stations for a radio base station which is waiting for connection in station-to-station connection in a connection state of station-to-station communication and has detected the radio base station, (i) stop station-to-station communication, and (ii) newly establish connection in station-to-station connection regarding the detected radio base station as the previous hop base station.

In this way, it is possible to merge the radio communication system to which the radio base station belongs and the other radio communication systems by the radio base station switching connection in station-to-station communication.

It is to be noted that preferred embodiments of the present invention are able to be implemented as not only a device, but also as a method having steps corresponding to a processor or processors of the device, as a program causing a computer to execute these steps, as a computer-readable recording medium such as a CD-ROM having the program recorded thereon, as information, data, or signals representing the program, etc. The program, information, data, or signals may be distributed via a communication network such as the Internet.

According to preferred embodiments of the present invention, radio communication terminals efficiently communicate with each of base stations in a tree network.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 5A-5C are illustrative diagrams of signals which are sent by the radio base station according to Preferred Embodiment 1 of the present invention.

DETAILED DESCRIPTION OF THE PREFERRED EMBODIMENTS

Figure 1A:
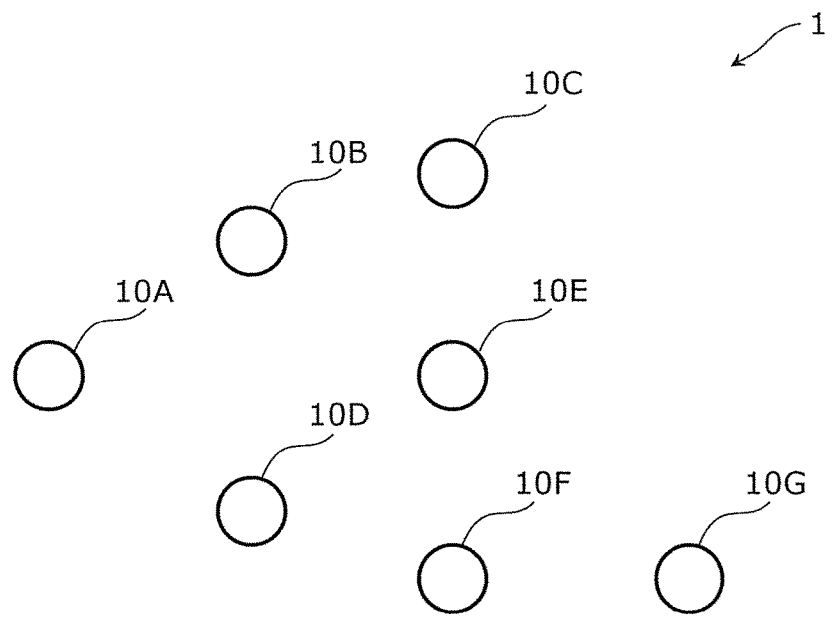
FIG. 1A is a system configuration diagram illustrating a first example of a radio communication system according to Preferred Embodiment 1 of the present invention.

It is to be noted that each of preferred embodiments of the present invention described below indicates a specific preferred example of the present invention. The numerical values, shapes, materials, constituent elements, the arrangement and connection of the constituent elements, steps, the processing order of the steps etc. shown in the following exemplary preferred embodiments are mere examples, and therefore are not intended to limit the scope of the present invention. Therefore, among the elements or features in the following exemplary preferred embodiments, elements or features not recited in any one of the independent claims that indicate the most generic concept of the present invention are explained as arbitrary elements or features of preferred embodiments of the present invention.

The same constituent elements are assigned with the same reference numerals, and the same descriptions thereof may be omitted.

Preferred Embodiment 1

In this preferred embodiment, descriptions are given of a radio communication system etc. which consumes reduced electricity to provide and maintain a communication path efficiently.

Figure 1B:
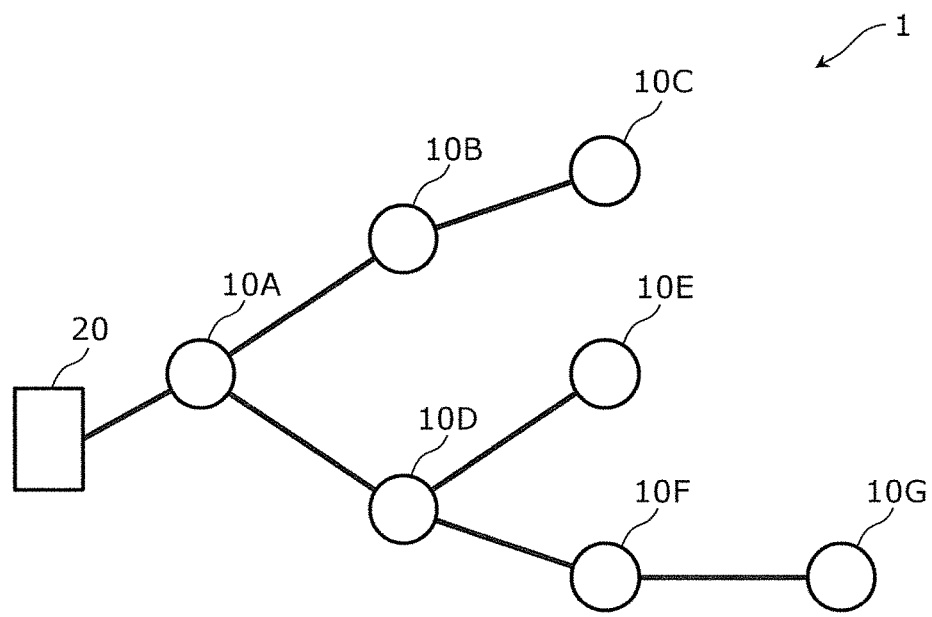
FIG. 1B is a system configuration diagram illustrating an example of a communication path in the first example of the radio communication system according to Preferred Embodiment 1 of the present invention.
Figure 1C:
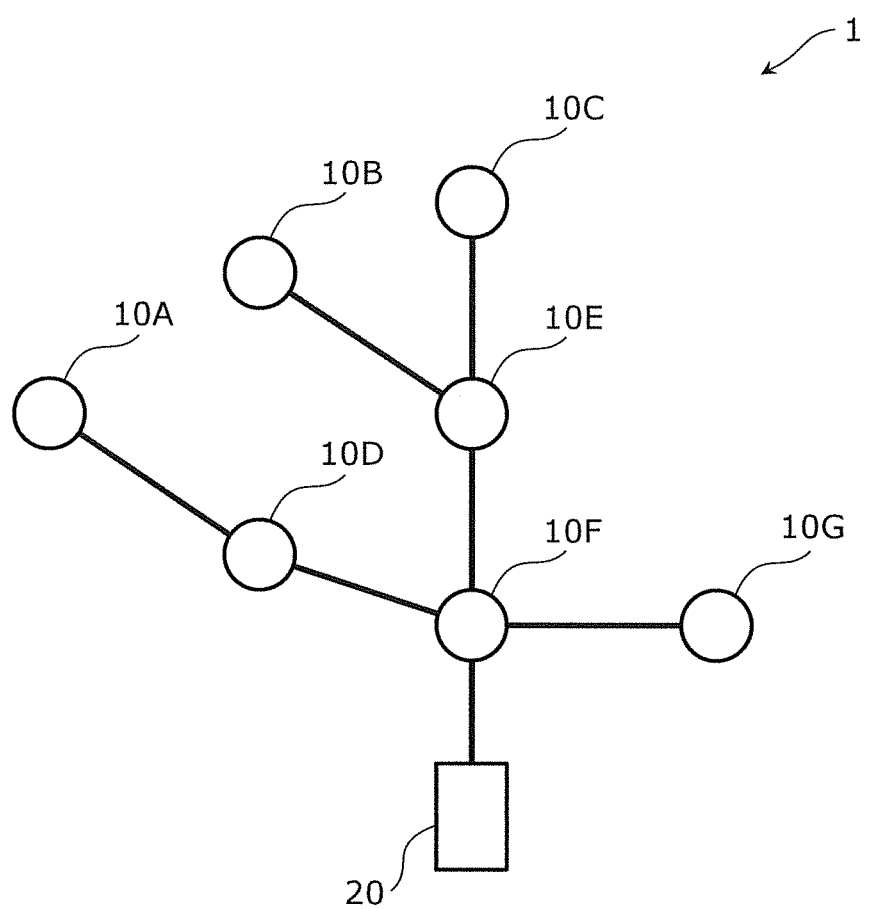
FIG. 1C is a system configuration diagram illustrating another example of the communication path in the first example of the radio communication system according to Preferred Embodiment 1 of the present invention.

FIG. 1A is a system configuration diagram illustrating a first example of a radio communication system 1 according to the present preferred embodiment. Each of FIGS. 1B and 1C are a system configuration diagram illustrating another example of the communication path in the first example of the radio communication system according to Preferred Embodiment 1.

As illustrated in FIG. 1A, radio communication system 1 includes: a plurality of radio base stations 10A, 10B, 10C, 10D, 10E, 10F, and 10G. Each of the plurality of radio base stations may be indicated as radio base station 10.

A radio base station 10 defines and functions as an access point (AP, also referred to as a base station or a parent station) which communicates with a station (STA, also referred to as a radio terminal or a terminal). A radio base station 10 communicates with radio base stations 10 other than the radio base station itself in the plurality of radio base stations 10. Here, communication with each of the radio base stations 10 other than the radio base station itself is also referred to as station-to-station communication. Each radio base station 10 may be a moving one, or a fixedly set one.

FIG. 1A illustrates a state in which each of radio base stations 10A to 10G is waiting. Each radio station only sends a beacon signal at a predetermined time interval, and does not perform station-to-station communication. When a radio terminal has connected to any of the radio base stations, a tree network including the radio base station to which the radio terminal connected as a root (start point) is configured. For example, FIG. 1B illustrates that a radio terminal 20 connected to the radio base station 10A, and a tree network including the radio base station 10A as a root has been configured. In addition, FIG. 1C illustrates that a radio terminal 20 connected to the radio base station 10F, and a tree network including the radio base station 10F as a root has been connected.

The tree network as described above is configured when the radio terminal 20 has connected to any of the radio base stations 10A to 10G included in the radio communication system 1. This allows the radio terminal 20 to communicate with each of the radio base stations 10A to 10G. For example, through this communication, the radio terminal 20 can obtain data etc. held by the radio base stations 10A to 10G.

It is to be noted that radio communication is performed using electric waves, and is possible between devices located within an electric wave reception range in which the electric waves maintain a strength exceeding a predetermined strength. In general, an electric wave attenuates at a predetermined rate when propagating in space without any shielding, and attenuates at a lager rate when there is a shielding in the space.

Figure 2:
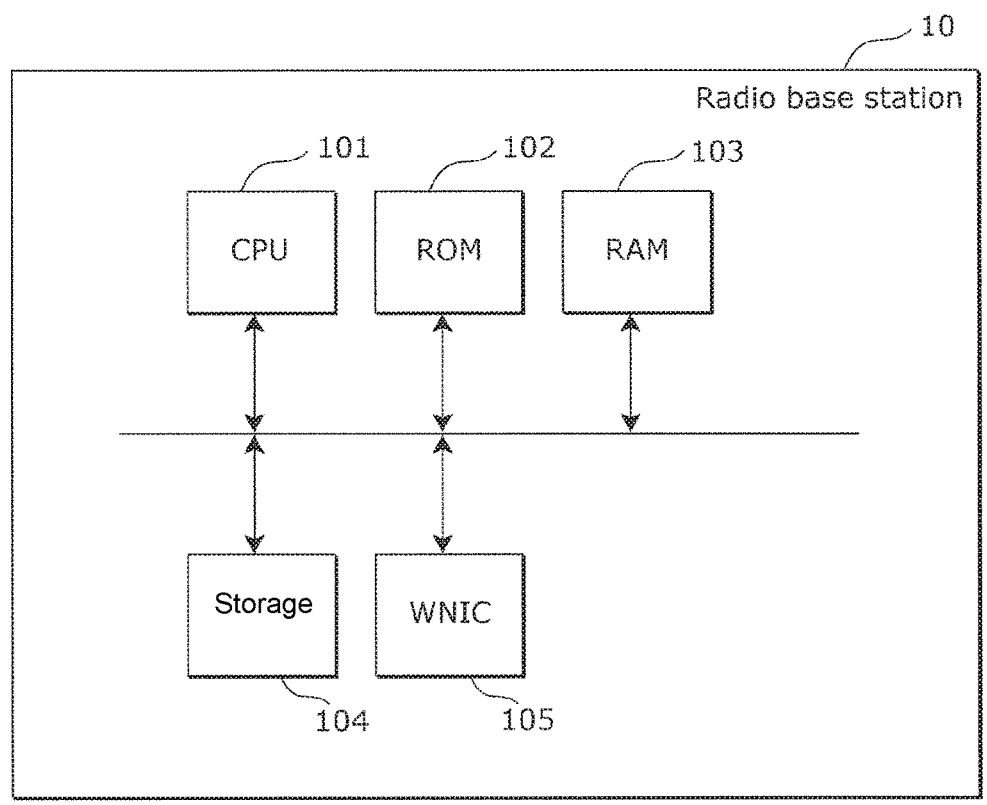
FIG. 2 is a block diagram illustrating a hardware configuration of the radio base station according to Preferred Embodiment 1 of the present invention.

FIG. 2 is a block diagram illustrating a hardware configuration of the radio base station according to the present preferred embodiment.

As illustrated in FIG. 2, radio base station 10 includes: a central processing unit (CPU) 101; a read only memory (ROM) 102; a random access memory (RAM) 103; a storage 104; a wireless network interface card (WNIC) 105.

CPU 101 is a processor which executes a control program stored in the ROM 102.

The ROM 102 is a read-only storage area that stores the control program etc.

The RAM 103 is a volatile storage area used as a working area which is used when the CPU 101 executes the control program.

The storage 104 is a non-volatile storage area which stores the control program, data, or the like.

The WNIC 105 is a radio communication interface which performs radio communication with radio terminals or the radio base stations 10 other than the radio base station itself. The types of radio communication interfaces are not limited. In other words, the WNIC 105 may be a radio LAN interface which conforms to the IEEE802.11a, b, g, n standards etc., or may be another radio communication interface.

It is to be noted that a plurality of WNICs 105 may be used. The WNIC 105 may be used by a terminal communicator 112 and a station-to-station communicator 114 which are described later. When the radio base station 10 includes the plurality of WNICs 105, the terminal communicator 112 may use a first WNIC 105, and the station-to-station communicator 114 may use a second WNIC 105. In this way, it is possible to cause each of the separate WNICs to perform communication having a different property, leading to an increase in the efficiency of communication and communication-related processing.

Figure 3:
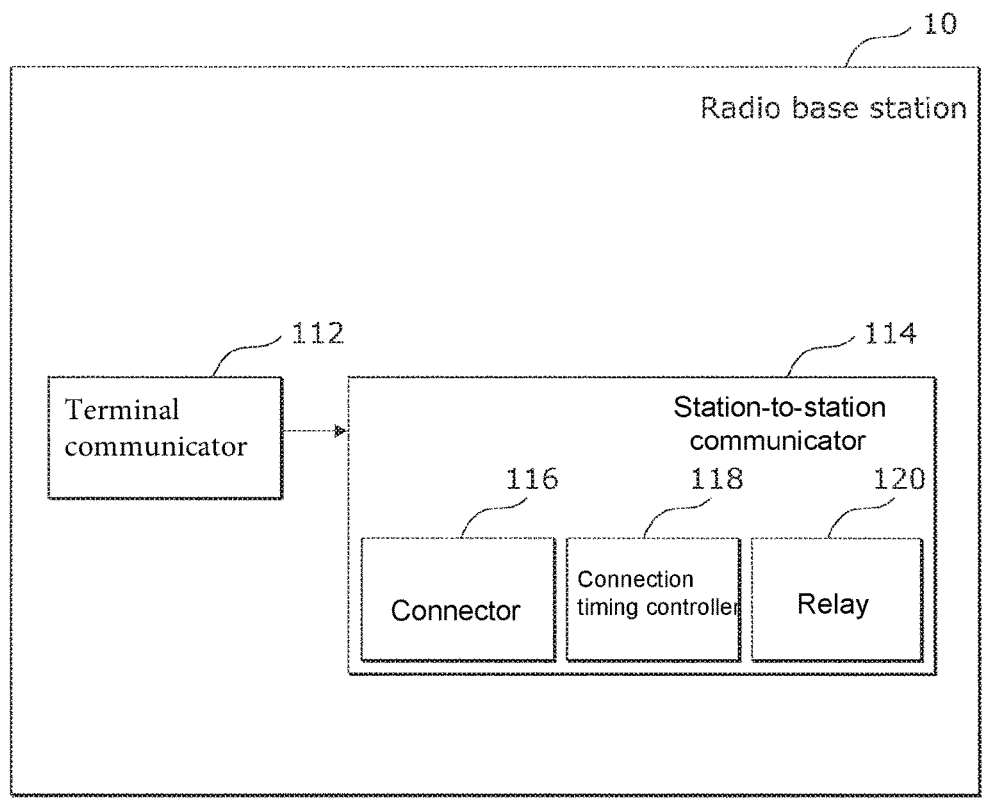
FIG. 3 is a block diagram illustrating a functional configuration of the radio base station according to Preferred Embodiment 1 of the present invention.

FIG. 3 is a block diagram illustrating a functional configuration of the radio base station according to the present preferred embodiment.

As illustrated in FIG. 3, the radio base station 10 includes the terminal communicator 112, and the station-to-station communicator 114.

The terminal communicator 112 communicates with the radio terminal. More specifically, the terminal communicator 112 performs communication, as an access point (hereinafter also referred to as "AP") with the radio terminal which is a station (hereinafter also referred to as "STA"). The communication corresponds to communication in an infrastructure mode in the IEEE802.11a, b, g, n standards etc. The terminal communicator 112 periodically sends a signal including an identifier for radio communication that the radio base station itself provides to neighboring devices. This signal is called a beacon signal, or simply a beacon. The identifier for the radio communication corresponds to, for example, a service set identifier (SSID). In addition, the beacon signal corresponds to, for example, a beacon frame in the IEEE802.11a etc.

The station-to-station communicator 114 performs station-to-station communication with radio base stations 10 other than the radio base station itself in the plurality of radio base stations 10. The station-to-station communication is performed between a radio base station 10 which is performing a waiting function to wait for connection in station-to-station communication and a radio base station 10 which is performing a connection function to establish connection in the station-to-station communication regarding the radio base station 10 which is performing the waiting function as a communication partner. In other words, the station-to-station connection is established when the radio base station 10 which is performing the connection function connects to the radio base station 10 which is performing the waiting function. The station-to-station communicator 114 starts and stops the waiting function and the connection function when appropriate. In addition, when the station-to-station communicator 114 has a station-to-station connection with each of the two radio base stations, the station-to-station communicator 114 relays communication between one of the radio base stations and the other radio base station.

It is to be noted that, for example, AP-to-AP communication using a WDS function is able to be used in the station-to-station communication. In addition, the radio base station which is performing the waiting function in the station-to-station communication may be also referred to as a WDS-AP, and the radio base station which is performing the connection function in the station-to-station communication may be also referred to as a WDS-ST.

It is to be noted that the respective waiting function and connection function may be implemented as software processes, for example. In this case, a start and a stop of the functions are realized by a start and a stop of the software processes.

Hereinafter, the station-to-station communicator 114 is described in detail.

The station-to-station communicator 114 includes a connector 116, a connection timing controller 118, and a relay 120.

The connection timing controller 118 provides a waiting function in station-to-station communication, and waits for connection in the station-to-station communication. The connection timing controller 118 periodically sends a signal including an identifier for station-to-station communication that the station itself provides to neighboring devices. This signal is referred to as a station-to-station beacon signal or a station-to-station beacon, to distinguish it from the beacon signal or the beacon sent by the terminal communicator 112. The identifier in the station-to-station communication corresponds to, for example, an SSID for station-to-station communication. In addition, as the station-to-station beacon signal, for example, a beacon frame in the IEEE802.11a is able to be used. The station-to-station beacon signal is described in detail later.

The connector 116 provides the connection function in station-to-station communication, and establishes connection in the station-to-station communication regarding the radio base station which is waiting for connection in the station-to-station communication as a communication partner. More specifically, the connector 116 determines whether or not any WDS-AP is present around the radio base station itself. In order to determine whether or not any WDS-AP is present around the radio base station itself, for example, the connector 116 waits for reception of a station-to-station beacon signal for a certain period of time (such as 1 second), and determines whether or not any station-to-station beacon signal from a WDS-AP is received within the waiting time. Any method is possible as a method to determine whether or not a currently received beacon signal is a station-to-station beacon signal from a WDS-AP after the reception of the beacon signal. For example, a description format for information to be included in a beacon signal may be determined in advance, and the connector 116 may determine that a current signal is a station-to-station beacon signal from a WDS-AP when the information in the received beacon signal is written according to the predetermined format.

When the connector 116 has a station-to-station connection with each of two radio base stations, the relay 120 relays communication between one of the radio base stations and the other radio base station.

The station-to-station communicator 114 starts or stops each of the connector 116 and the connection timing controller 118 when appropriate.

For example, the station-to-station communicator 114 starts an operation by the connection timing controller 118 when the terminal communicator 112 has established a communication link with the radio terminal 20.

In addition, for example, when the station-to-station communicator 114 has detected a radio base station which is performing a waiting function in the plurality of radio base stations 10, the station-to-station communicator 114 (i) starts an operation by the connector 116 to cause the connector 116 to start station-to-station communication with the radio base station, and (ii) starts the connection timing controller 118.

Each of the terminal communicator 112 and the station-to-station communicator 114 is implemented as a CPU 101, a ROM 102, a RAM 103, a storage 104, a WNIC 105, or the like.

Figure 4:
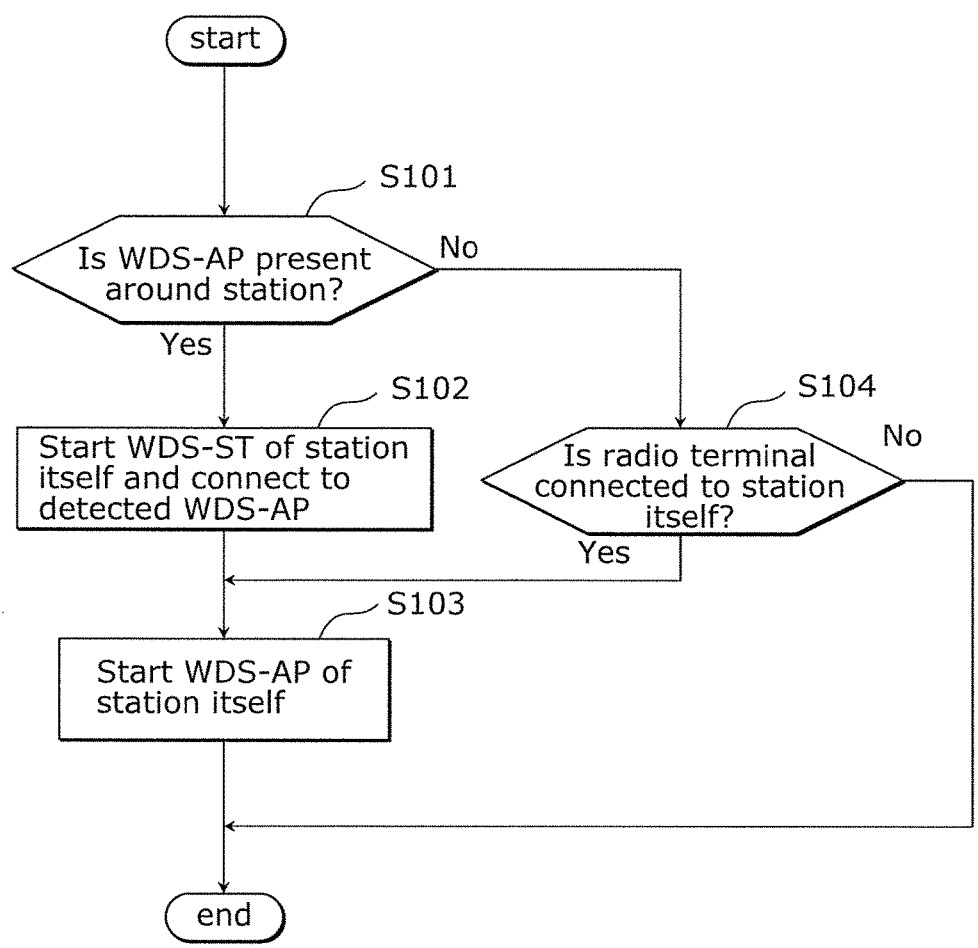
FIG. 4 is a flowchart indicating a path configuration process by the radio base station according to Preferred Embodiment 1 of the present invention.

FIG. 4 is a flowchart indicating a path configuration process by the radio base station according to this preferred embodiment.

In Step S101, the connector 116 determines whether or not any WDS-AP is present around the radio base station itself.

When it has been determined that a WDS-AP is present around the radio base station itself in Step S101 (Yes in Step S101), Step S102 is performed. On the other hand, when it has been determined that no WDS-AP is present around the radio base station itself in Step S101 (No in Step S101), Step S104 is performed.

In Step S102, the station-to-station communicator 114 starts an operation by the WDS-ST (the connector 116). The connector 116 which started the operation establishes connection in station-to-station communication regarding the WDS-AP detected in Step S101 as a communication partner.

In Step S103, the station-to-station communicator 114 starts an operation by the WDS-AP (the connection timing controller 118). The WDS-AP starts periodically sending a station-to-station beacon signal. This is the end of the sequential processes.

In Step S104, the terminal communicator 112 determines whether or not a radio terminal 20 has connected to the radio base station itself. When the terminal communicator 112 has determined that a radio terminal 20 connected to the radio base station itself (Yes in Step S104), Step S103 is executed. On the other hand, when the terminal communicator 112 has determined that no radio terminal 20 connected to the radio base station itself (No in Step S104), the sequential processes end.

It is to be noted that the sequential processes are executed at predetermined timings, and may be executed repeatedly at certain time intervals.

FIGS. 5A-5C illustrate of station-to-station beacon signals which are sent by the radio base station 10 according to the preferred embodiment of the present invention.

FIG. 5A is an illustration diagram of information included in a station-to-station beacon signal 501 to be sent by the radio base station 10. As illustrated in FIG. 5A, the station-to-station beacon signal 501 includes the following information items such as a root address, a sender address, and the number of hops.

The route address indicates an identifier of a radio base station corresponding to a root (starting point) of a tree communication path including the plurality of radio base stations 10. It is to be noted that the radio base station corresponding to the starting point is also referred to as a root radio base station or simply as a root. In FIG. 8 which is described later, the root radio base station is the radio base station 10A which is directly connecting to the radio terminal 20.

The sender address indicates the identifier of the radio base station 10 which sent the station-to-station beacon signal.

The number of hops indicates the number of communication links linked by the radio base station 10 which sent the station-to-station beacon signal on the communication path from the root radio base station.

FIGS. 5B and 5C each indicate specific values included in the respective information items. These information items are described in detail later.

It is to be noted that the station-to-station beacon signal 501 may include information other than the information illustrated in FIG. 5A. For example, the station-to-station beacon signal 501 may further include an identifier made up of a predetermined character string. Such identifier can be used when, for example, a communication path is desired to be provided to include radio base stations manufactured by the same manufacturer.

Figures 6, 7:
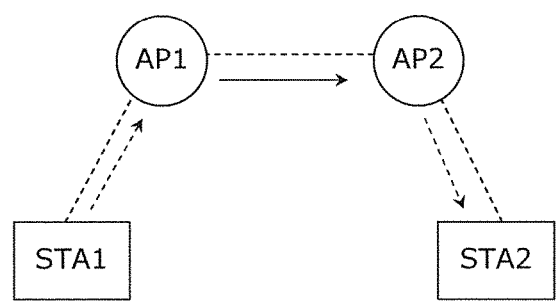
FIG. 6 is an illustration of a wireless distribution system (WDS).
FIG. 7 is an illustrative diagram of frame formats for use in communication performed by the WDS.

FIG. 6 is a network configuration diagram in communication performed by a WDS.

FIG. 6 illustrates that, in the communication performed by the WDS, a radio terminal STA1 which connects to a radio base station AP1 in infrastructure mode and a radio terminal STA2 which connects to a radio base station AP2 in infrastructure mode communicate through relay by the AP1 and the AP2.

FIG. 7 is an illustrative diagram of frame formats for use in communication performed by the WDS.

This frame format is a frame format of frames for use by the AP1 and the AP2 in FIG. 6. As illustrated in FIG. 7, a frame including four address fields (Add1 to Add4) is used in the WDS as illustrated in FIG. 7 whereas a frame having three address fields is used in infrastructure mode. In addition, a "To DS" field is a field that indicates whether or not the frame is a frame that should be sent to a radio base station, a "From DS" field is a field that indicates whether or not the frame is a frame sent by the radio base station. Both of the fields are set to 1 (positive).

Hereinafter, descriptions are given of operations performed by the radio base stations 10 in the radio communication system including the plurality of radio base stations 10.

Figure 8A:
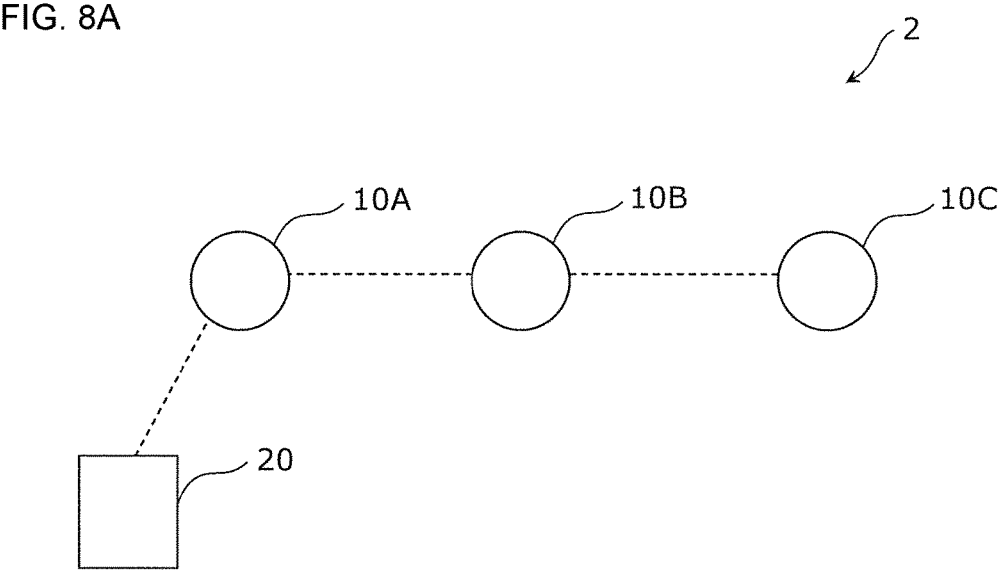
FIGS. 8A and 8B are system configuration diagrams illustrating a second example of a radio communication system according to Preferred Embodiment 1 of the present invention.
Figure 8B:
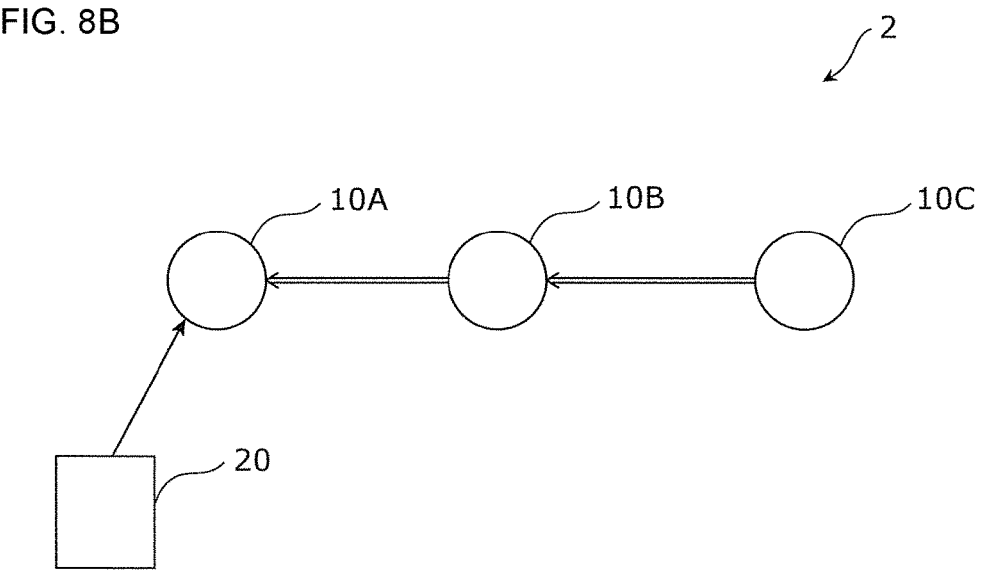

FIGS. 8A and 8B are system configuration diagrams illustrating a second example of a radio communication system according to the present preferred embodiment.

The radio communication system 2 illustrated in FIG. 8A includes a radio terminal 20, and three radio base stations 10A, 10B, and 10C. The respective radio base stations 10A, 10B, and 10C correspond to the radio base stations 10.

Hereinafter, descriptions are given of a flow of processes performed when a communication path as illustrated in FIG. 8B is configured on the radio communication system 2 by the radio terminal 20 connecting to the radio base station 10A. In FIG. 8B, devices (an AP and STAs) between which radio communication links have been established are indicated by arrows. Starting points of the arrows indicate the STA sides in the radio communication links, and the ending points of the arrows indicate the AP sides in the radio communication links.

It is to be noted that, in the radio communication system, a radio base station adjacent in the direction closer to the root base station is also referred to as a "previous hop base station". In addition, in the radio communication system, a radio base station adjacent in the direction more distant from the root base station is also referred to as a "next hop base station". Specifically, for example, in FIG. 8B, the previous hop base station of the radio base station 10B is the radio base station 10A, and the next hop base station of the radio base station 10B is the radio base station 10C.

It is to be noted that, in FIGS. 8A and 8B, the radio base stations 10 capable of directly performing radio communication are indicated by broken lines. Here, the radio base stations 10 are "capable of directly performing radio communication". This indicates that the radio base stations 10 are capable of establishing radio communication links because electric waves in radio communication can reach them. The devices capable of directly performing radio communication are indicated by broken lines also in the other drawings.

Figure 9:
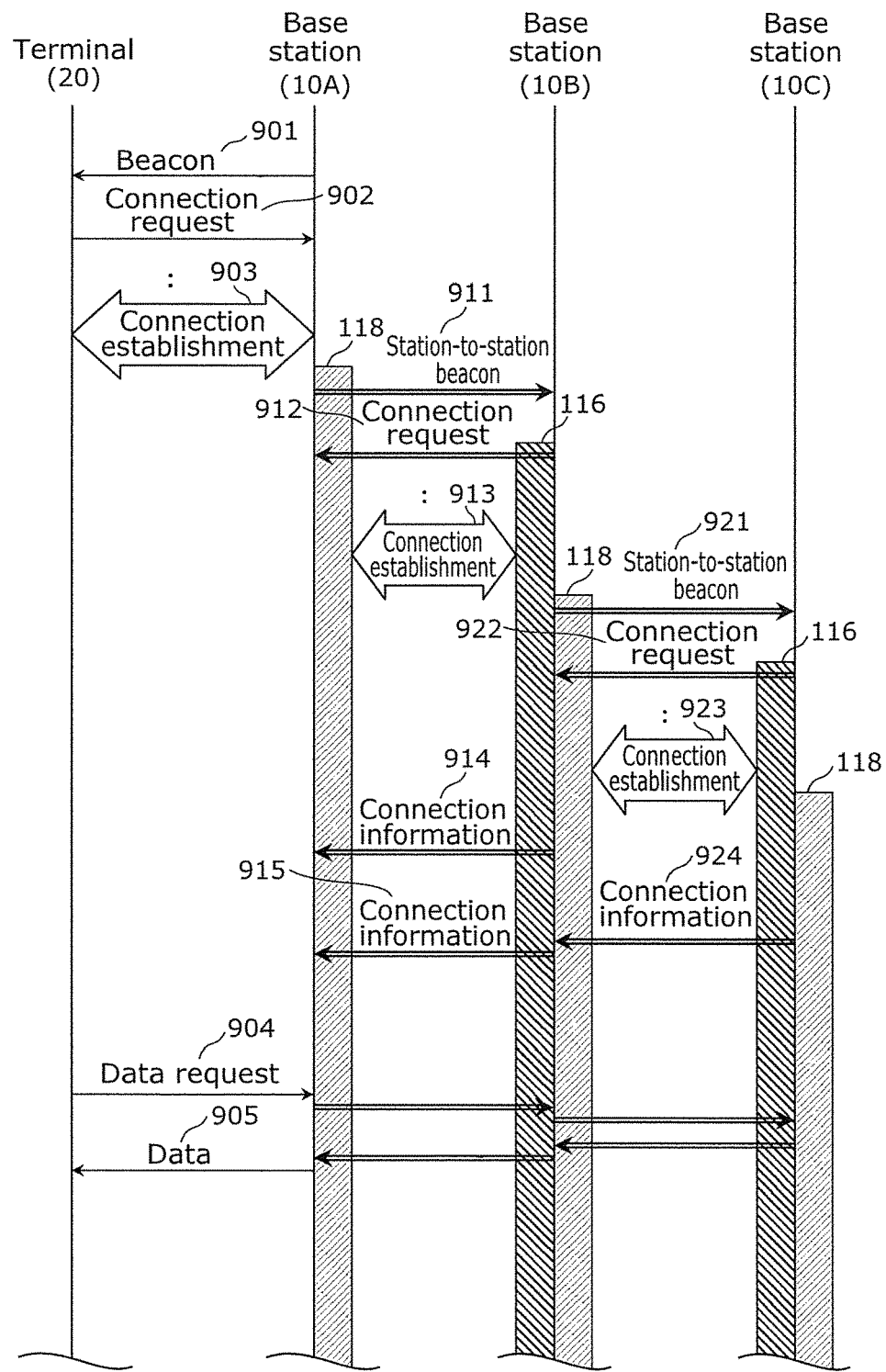
FIG. 9 is a sequence diagram illustrating a path configuration process by the radio base station according to Preferred Embodiment 1 of the present invention.

FIG. 9 is a sequence diagram illustrating a path configuration process by the radio base station according to this preferred embodiment.

The radio terminal 20 receives a beacon signal 901 which the radio base station 10A sends. The beacon signal 901 is intended to be periodically sent by the radio base station 10A irrespective of whether or not the radio terminal 20 is present. The beacon signal 901 includes an identifier in radio communication provided by the radio base station 10A.

The radio terminal 20 sends connection request 902 to the radio base station 10A in infrastructure mode. In the connection, an identifier included in a previously received beacon signal 901 is used. In other words, the radio terminal 20 sends the connection request to the radio base station 10A which is a radio base station indicated by the identifier included in the beacon signal 901.

The radio terminal 20 and the radio base station 10A perform connection establishment 903 by performing authentication and association, etc. for mutual connection in radio communication. In this way, the radio terminal 20 is ready for the radio communication with the radio base station 10A (corresponding to (Yes) in Step S104 in FIG. 4).

The radio base station 10A which established radio communication with the radio terminal 20 causes the connection timing controller 118 to start operating (corresponding to Step S103 in FIG. 4). The connection timing controller 118 of the radio base station 10A sends a station-to-station beacon signal 911 to neighboring devices. Each of information items included in the station-to-station beacon signal 911 is the same as those in the case of the station-to-station beacon signal 502 indicated in FIG. 5B. In other words, it is assumed that each of a root address and a sender address is a media access control (MAC) address of the radio base station 10A, and that the number of hops is 1. The station-to-station beacon signal 911 is a station-to-station beacon signal sent by the radio base station 10A so as to be used to configure a communication path when the root is the radio base station 10A.

The radio base station 10B receives the station-to-station beacon signal 911 from the radio base station 10A (corresponding to (Yes) in Step S101 in FIG. 4). Upon receiving the station-to-station beacon signal 911, the radio base station 10B causes the connector 116 to start operating. The connector 116 sends a connection request 912 in station-to-station communication to the radio base station 10A based on the identifier included in the station-to-station beacon signal 911 (corresponding to Step S102 in FIG. 4).

The connection timing controller 118 of the radio base station 10A and the connector 116 of the radio base station 10B perform connection establishment 913 by performing mutual authentication for connection and association, etc. in station-to-station communication. In this way, the radio base station 10B is ready for the station-to-station communication with the radio base station 10A. Among the plurality of radio base stations 10 in the radio communication system 1, the radio base station 10A is a radio base station which is waiting for connection in station-to-station communication, and is a previous hop base station of the radio base station 10B. In other words, the radio base station 10B detects the radio base station which is waiting for the connection in the station-to-station communication among the plurality of radio base station 10, and establishes the connection in the station-to-station communication regarding the previous hop base station which is the detected radio base station as a communication partner. In addition, the radio terminal 20, and the radio base stations 10A and 10B are capable of communicating with each other via the radio base station 10A appropriately relaying the communication.

The radio base station 10B establishes connection with the radio base station 10A in station-to-station communication, and causes the connection timing controller 118 to start operating (corresponding to Step S103 in FIG. 4). The connection timing controller 118 of the radio base station 10B sends a station-to-station beacon signal 921 to neighboring devices. Each of information items included in the station-to-station beacon signal 921 is the same as those in the case of the station-to-station beacon signal 503 indicated in FIG. 5C. In other words, it is assumed that the root address is a MAC address of the radio base station 10A, that the sender address is a MAC address of the radio base station 10B, and that the number of hops is 2. The station-to-station beacon signal 921 is a station-to-station beacon signal sent by the radio base station 10B so as to be used to configure a communication path when the root is the radio base station 10A.

It is assumed here that the number of hops in the station-to-station beacon signal which is sent by the radio base station 10B is 2 obtainable by adding 1 which is the number of hops from the radio base station 10A to 10B to 1 which is the number of hops in the station-to-station beacon signal which is sent by the radio base station 10A. It is also good to reflect communication quality between the radio base stations 10A and 10B by adding a larger number of hops as communication quality is lower. In other words, when the communication quality between the radio base stations 10A and 10B is comparatively low, the number of hops may be 17 obtainable by adding 16 to 1 which is the number of hops in the station-to-station beacon signal which is sent by the radio base station 10A. In this way, when there is another radio base station capable of communication, a communication path including a radio communication link having a low communication quality is less likely to be selected. This increases stability of communication. Communication quality is able to be determined assuming that, for example, a communication quality is more excellent as an electric wave reception strength is higher.

Upon receiving the station-to-station beacon signal 921 from the radio base station 10B, the radio base station 10C performs connection establishment 923 in the station-to-station communication with the radio base station 10B after a connection request 922 etc. This processing is the same as the processing performed by the radio base station 10B, and thus detailed descriptions are omitted. In this way, the radio base station 10C is ready for the station-to-station communication with the radio base station 10B. In addition, the radio terminal 20, the radio base stations 10A, 10B and 10C are capable of communicating with each other via the radio base station 10B appropriately relaying the communication.

The radio base station 10B sends terminal information 914 indicating a radio terminal which connects to the radio base station itself in infrastructure mode to the radio base station 10A which is the previous hop base station.

Likewise, the radio base station 10C sends terminal information 924 indicating a radio terminal which connects to the radio base station itself in infrastructure mode to the radio base station 10B which is the next hop base station. The radio base station 10B which received the terminal information 924 sends it to the radio base station 10A located upstream as terminal information 915. It is to be noted that terminal information needs only to include information indicating connection of the latest radio terminal and to be sent when the number of radio terminals connected to the radio base station itself has increased or decreased. Furthermore, the terminal information may be sent periodically or at predetermined timings even when the number of radio terminals connected to the radio base station itself has not increased or decreased.

The radio terminal 20 sends a data request 904 which is a request to obtain data held by the radio base station 10C to the radio base station 10C. The data request 904 is relayed by the relays of the radio base stations 10A and 10B in the station-to-station communication, and is received by the radio base station 10C. In this way, the relays of the radio base stations 10A and 10B relay the communication between the previous hop base station and the next hop base station.

In response to the received request, the radio base station 10C sends the requested data to the radio terminal 20 as data 905. In this way, the radio terminal 20 is capable of obtaining data held by the radio base station 10C via the radio base stations 10A and 10B.

It is to be noted that the radio terminal 20 is also able to communicate with the radio base station 10A or 10B as a matter of course. When a radio terminal is connected to the radio base station 10B or 10C, the radio terminal 20 is also able to communicate with the radio terminal connected to the radio base station 10B or 10C as a matter of course.

By doing as described above, it is possible to reduce an amount of electricity required to configure and maintain a communication path because a communication path is dynamically configured between the radio base stations 10A, 10B, and 10C, triggered by the connection of the radio terminal 20 to the radio base station 10A. Conventional techniques includes a technique to provide communication paths between radio base stations irrespective of whether or not a radio terminal 20 connects or performs communication. This technique requires that the radio base stations always maintain the communication path between them irrespective of operations by the radio terminal 20, and thus that electricity needs to be consumed for the communication. The radio base stations according to this preferred embodiment provide a communication path triggered by an increase in the possibility of occurrence of communication by the radio terminal 20. Thus, the radio base stations provide an effect of reducing electricity required for communication to maintain the communication path.

When the radio base station, which is trying to establish station-to-station communication, receives a station-to-station beacon signal from a plurality of radio base stations, it is only necessary to establish station-to-station communication with a radio base station which sent a beacon signal including a smaller number of hops. This is because the radio base station which sent the beacon signal including a smaller number of hops consumes less electricity since the number of radio base stations which relay the communication with the radio terminals is smaller.

As described above, triggered by the establishment of communication links with the radio terminals, the radio communication system according to this preferred embodiment provides a communication path by setting path information sequentially for a second base station and a third base station regarding a first base station as a root. In this way, the radio terminal is able to communicate with the third base station through relay by the first base station and the second base station. In addition, when an appropriate communication path is maintained, occurrence of useless communication for searching a communication path is reduced or prevented, which provides an effect of reducing electricity to be consumed. As described above, the radio communication system is capable of efficiently configuring a communication path, and reducing electricity required to maintain the configured communication path.

Preferred Embodiment 2

In this preferred embodiment, descriptions are given of processing performed to cancel a communication path in a radio communication system which consumes reduced electricity to configure and maintain the communication path.

Figure 10:
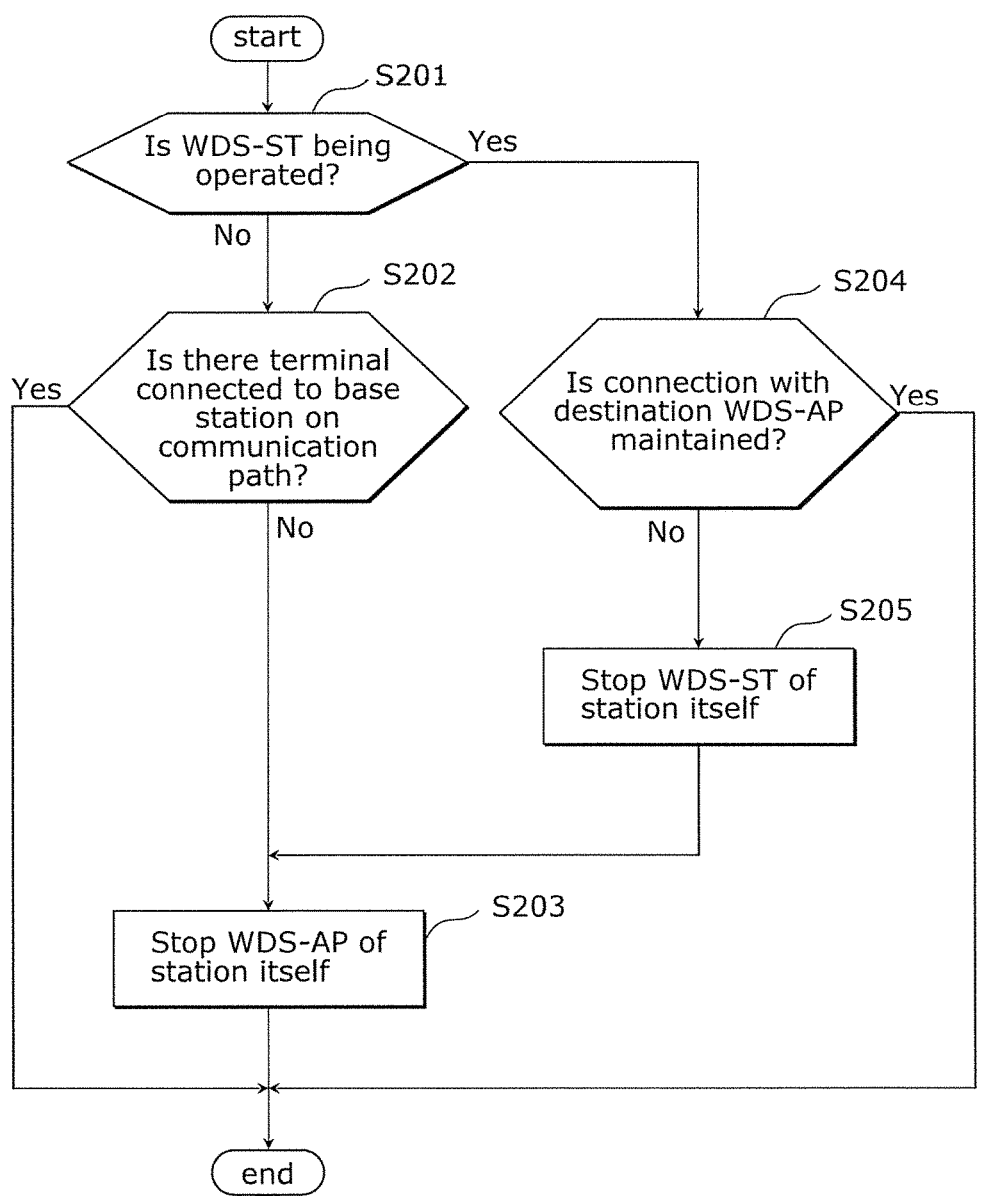
FIG. 10 is a flowchart indicating a path cancellation process by the radio base station according to Preferred Embodiment 2 of the present invention.

FIG. 10 is a flowchart indicating a path cancellation process by the radio base station according to this preferred embodiment.

In Step S210, the station-to-station communicator 114 determines whether or not a WDS-ST (connector 116) is being operated. When the station-to-station communicator 114 has determined that the WDS-ST was operating in Step S201 (Yes in Step S201), Step S204 is performed. On the other hand, when the station-to-station communicator 114 has determined that the WDS-ST was not operating in Step S201 (No in Step S201), Step S202 is performed.

In Step S202, the station-to-station communicator 114 determines whether or not there is a radio terminal connected to the radio base station on the communication path. Whether or not there is a radio terminal which is connecting to the radio base station on the communication path is determined based on information relating to the radio terminal included in the connection information which is received from the radio base station on the communication path.

When it was determined that there was a radio terminal in Step S202 (Yes in Step S202), the sequential processes end. In other words, in this case, the station-to-station communicator 114 prohibits the WDS-AP (connection timing controller 118) from stopping operating, and ends the sequential processes.

On the other hand, when it was determined that there was no radio terminal (No in Step S202), Step S203 is performed.

In Step S203, the station-to-station communicator 114 starts an operation by the WDS-AP (the connection timing controller 118). In this way, the radio base station 10 stops periodically sending a station-to-station beacon signal.

In Step S204, the station-to-station communicator 114 determines whether or not the established station-to-station connection with the WDS-AP is currently being maintained. More specifically, the station-to-station communicator 114 determines that the station-to-station connection with the WDS-AP is not currently being maintained, in the case where the station-to-station communicator 114 is periodically receiving a station-to-station beacon signal from the established WDS-AP. Alternatively, it is also possible to determine that station-to-station connection is maintained by the station-to-station communicator 114 sending a predetermined communication packet to the WDS-AP, and receiving a response packet which is sent by the WDS-AP according to the sent communication packet. In Step S204, when it was determined that the station-to-station connection with the WDS-AP was maintained, the sequential processes are ended. On the other hand, when it was determined that the station-to-station connection with the WDS-AP was not maintained, Step S205 is performed.

In Step S205, the station-to-station communicator 114 starts an operation by the WDS-ST (connector 116).

It is to be noted that the sequential processes are executed at predetermined timings, and may be executed repeatedly at certain time intervals.

Figure 11:
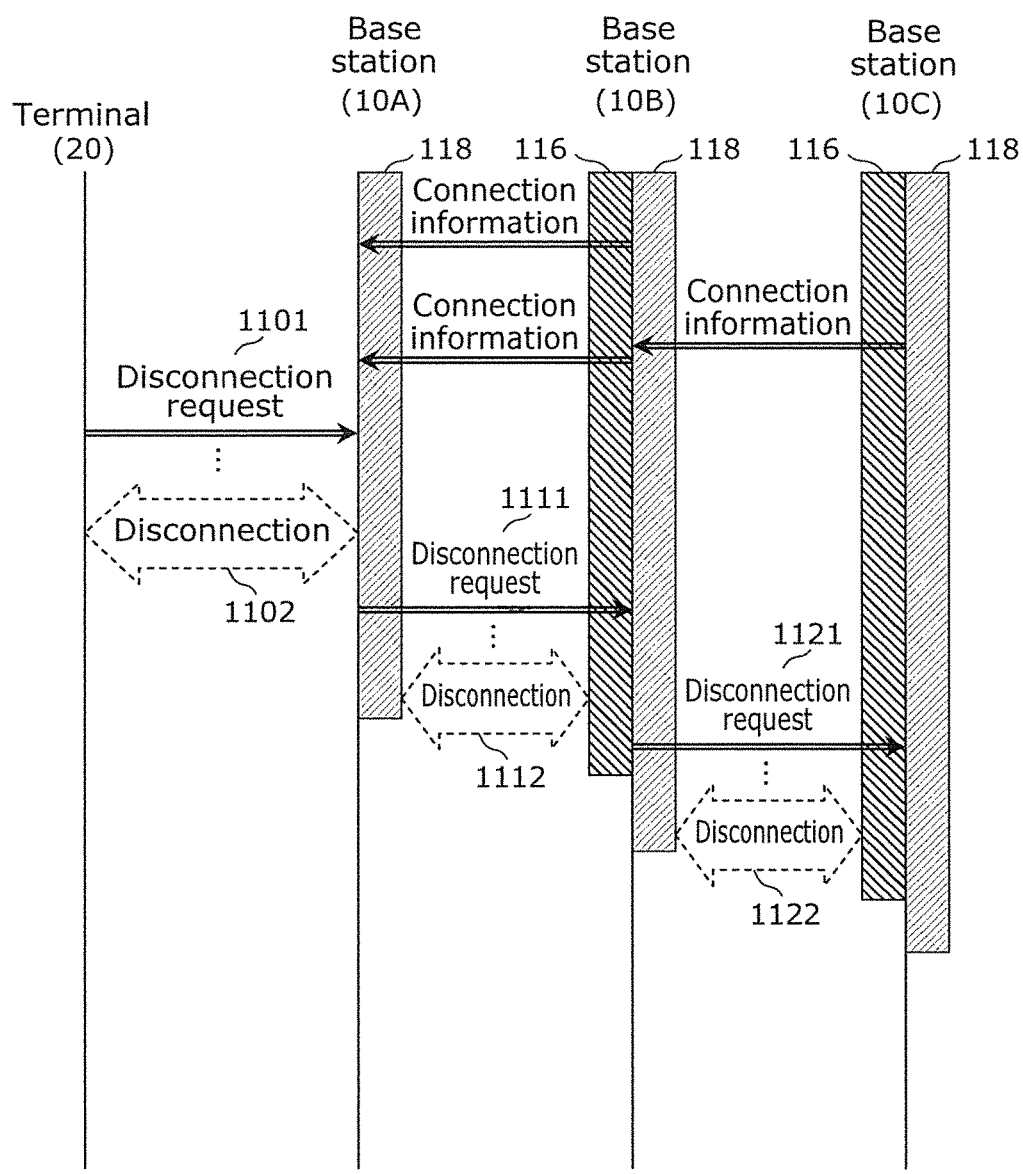
FIG. 11 is a sequence diagram indicating a path cancellation process by the radio base station according to Preferred Embodiment 2 of the present invention.

FIG. 11 is a sequence diagram indicating a path cancellation process by the radio base station according to this preferred embodiment. FIG. 11 illustrates processing performed subsequent to the processing in the sequence diagram illustrated in FIG. 9, in which a communication path between the radio base stations 10A, 10B, and 10C is cancelled when the radio terminal 20 disconnects the connection with the radio base station 10A.

As explained in relation to FIG. 9, each of the radio base stations 10B and 10C sends connection information 914 etc. related to a radio terminal which connects to the radio base station itself to the radio base station 10A. In this way, the radio base station 10A which is a root in the communication path includes information about the presence/absence of the radio terminal which connects to the radio base station on the connection path.

The radio terminal 20 which connects to the radio base station 10A sends a disconnection request 1101 to disconnect the connection with the radio base station 10A to the radio base station 10A.

The radio terminal 20 and the radio base station 10A perform disconnection 1102 by performing mutual deauthentication and deassociation in the radio communication.

The station-to-station communicator 114 of the radio base station 10A determines whether or not a radio terminal is connected to the radio base station on a distribution path (corresponding to Step S202 in FIG. 10). Here, it is determined that no radio terminal is connected to the radio base station on the distribution path, and thus the radio base station 10A disconnects the connection in station-to-station communication with the radio base station 10B (corresponding to Step S203 in FIG. 10). More specifically, the radio base station 10A sends a disconnection request 1111 to the radio base station 10B.

The radio base station 10A and the radio base station 10B perform disconnection 1112 by performing mutual deauthentication and deassociation in the radio communication. Subsequently, the radio base station 10A causes the connection timing controller 118 to stop operating.

When the radio base station 10B disassociates the connection in the station-to-station communication with the radio base station 10A, the connection with the destination WDS-AP is lost (corresponding to (No) in Step S204 in FIG. 10). Subsequently, the radio base station 10B causes the WDS-ST (connector 116) to stop operating. In addition, the radio base station 10B sends the disconnection request 1121 to the radio base station 10C, and after the disconnection 1122 is performed, causes the WDS-AP (connection timing controller 118) to stop operating (corresponding to Step S203 in FIG. 10).

Likewise, the radio base station 10C deassociates the connection in the station-to-station communication with the radio base station 10B, and then causes the WDS-ST (connector 116) and the WDS-AP (connection timing controller 118) to stop operating.

In this way, the connection path configured between the radio base stations disappears triggered by the disconnection between the radio terminal 20 and the radio base station 10A.

It is to be noted that, in the case of FIG. 11, the connection with the radio base station 10A was deassociated by the radio terminal 20 positively sending the disconnection request. Alternatively, the connection between the radio terminal 20 and the radio base station 10A is deassociated when, for example, the radio terminal 20 moves away from the communication range of the radio base station 10A.

As described above, the radio communication system according to this preferred embodiment causes the communication path to disappear by cancelling path information in the first base station, the second base station, and the third base station which have been set, triggered by the disconnection of the communication link with the radio terminal. The disappearance of the communication link means that the communication partner was lost. A communication path which is not necessary anymore is cancelled at an appropriate timing by cancelling the communication path triggered by the disappearance of the communication link. In this way, each of the radio base stations returns to a waiting state, that is, returns to a state only to send a beacon signal at predetermined time intervals. When a communication path needs to be configured later, it is possible to newly configure an appropriate communication path regarding one of the base stations to which the radio terminal connects as a root.

Preferred Embodiment 3

In this preferred embodiment, descriptions are given of processing performed to merge a plurality of radio communication systems which are present independently to a single radio communication system which consumes reduced electricity to configure and maintain the communication path.

Figure 12:
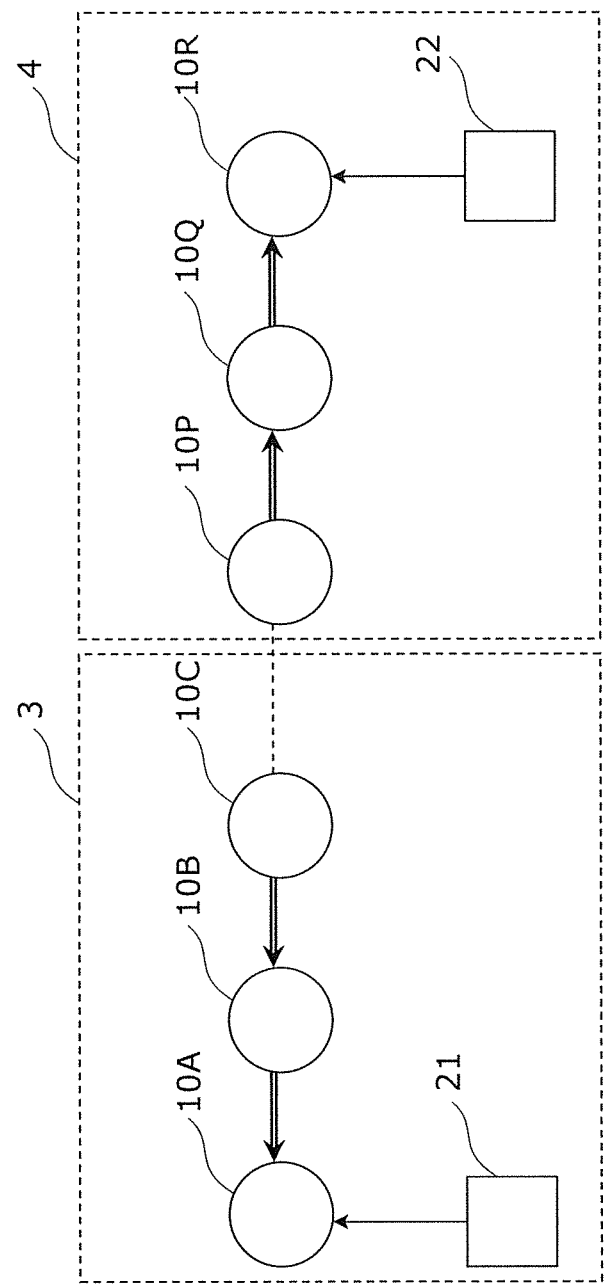
FIG. 12 is a system configuration diagram illustrating a third example of a radio communication system according to Preferred Embodiment 3 of the present invention.

FIG. 12 is a system configuration diagram illustrating a third example of a radio communication system according to this preferred embodiment.

FIG. 12 illustrates the plurality of radio communication systems 3 and 4 which are present independently. Each of the radio communication systems 3 and 4 is equivalent to the radio communication system 1 in Preferred Embodiment 1, and includes three radio base stations 10A, 10B, and 10C (10P, 10Q, and 10R), and a single radio terminal 21 (22).

This state occurs in the following cases.

An example of the cases is a case in which the radio terminal 22 connects to the radio base station 10R approximately at the same time as when the radio terminal 21 connects to the radio base station 10A. In this case, through the path configuration processing illustrated in Preferred Embodiment 1, the radio base stations 10A and 10B are connected to each other and then the radio base stations 10B and 10C are connected to each other so as to configure a radio communication system 3. In addition, at the same time, the radio base stations 10R and 10Q are connected to each other and then the radio base stations 10Q and 10P are connected to each other so as to configure a radio communication system 4. In this way, the state illustrated in FIG. 12 occurs.

In addition, for example, a radio communication system is configured such that a group of a radio terminal 21 and the radio base stations 10A, 10B, and 10C and a group of a radio terminal 22 and the radio base stations 10P, 10Q, and 10R are spaced apart from each other, and then the groups move toward each other. In this case, the path configuration processing illustrated in Preferred Embodiment 1 is performed in each of the groups, so as to configure the radio communication systems 3 and 4.

In FIG. 12, the radio base stations 10C and 10P are spaced apart by a distance which allows direct communication, but no connection in station-to-station communication is established. In this case, the radio terminal 21, the radio base stations 10P, 10Q, and 10R cannot communicate. In addition, the radio terminal 22, the radio base stations 10A, 10B, and 10C cannot communicate. Furthermore, the radio terminals 21 and 22 cannot communicate through the radio base stations 10A, 10B, 10C, 10P, 10Q, and 10R.

Hereinafter, descriptions are given of a method for allowing communication between the radio terminals 21 and 22 by appropriately configuring a radio communication system. More specifically, descriptions are given of a method for merging a plurality of radio communication systems to a single radio communication system.

FIG. 13 is an illustrative diagram indicating a path merge process by the radio base station according to this preferred embodiment.

In FIGS. 13A-13D illustrate processes in which the plurality of radio communication systems are merged to the single radio communication system in this sequence. It is to be noted that the radio terminals 21 and 22 are not illustrated in FIG. 13A-13C.

Figure 13A:
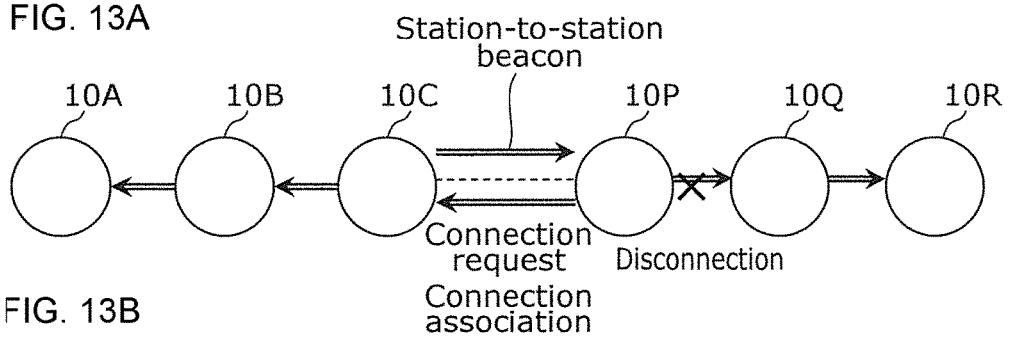
FIGS. 13A-13D are illustrative diagrams indicating a path merge process by the radio base station according to Preferred Embodiment 3 of the present invention.

First, a process performed by the radio base station 10P to switch station-to-station communication is described with reference to FIG. 13A.

As illustrated in Preferred Embodiment 1, the radio base station 10C in the radio communication system causes the connection timing controller 118 to keep operating, and sends a station-to-station beacon. The radio base station 10P is located at a position that allows direct communication with the radio base station 10C, and thus the radio base station 10P receives a station-to-station beacon signal sent by the radio base station 10C. Upon receiving the station-to-station beacon signal, the radio base station 10P determines which one of a route address included in the station-to-station beacon signal and a root address of a communication path which is currently connected is prioritized over the other. Subsequently, when the root address included in the station-to-station beacon signal is prioritized, the communication partner in the station-to-station communication is switched.

Here, when the address of the radio base station 10A is prioritized over the address of the radio base station 10R, the radio base station 10P disconnects the connection in the station-to-station communication with the radio base station 10Q, and establishes connection in station-to-station communication with the radio base station 10C.

It is to be noted that, the determination whether or not which one of the addresses is prioritized is made by, for example, determining the magnitude relationship of numerical values indicating the respective addresses. At this time, the one having a larger value may be prioritized, or the one having a smaller value may be prioritized.

Figure 13B:
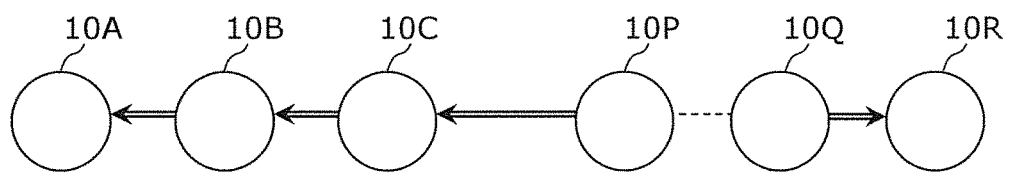

After the radio base station 10P switches connection partners in the station-to-station communication from the radio base station 10Q to 10C, the state of FIG. 13B is created.

In FIG. 13B, the radio base station 10Q performs similar processing to the radio base station 10P as described above, and switches connection partners in the station-to-station communication from the radio base station 10R to 10P. This creates the state of FIG. 13C.

Figure 13C:
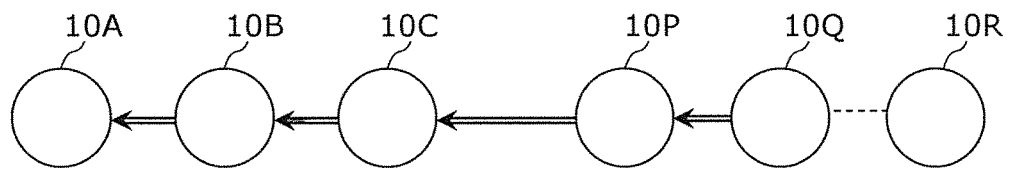
Figure 13D:
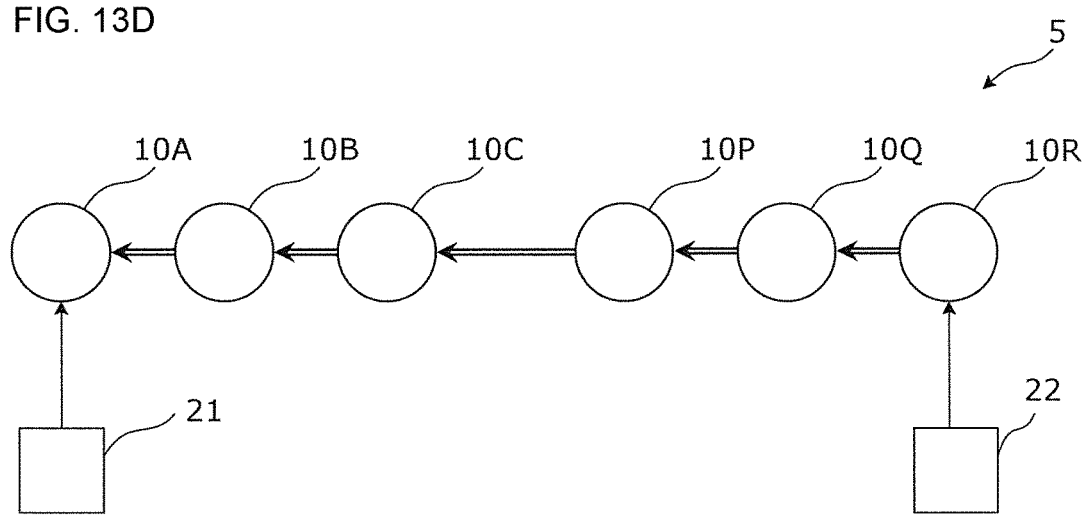

In FIG. 13C, the radio base station 10R establishes connection with the radio base station 10Q in station-to-station communication. This creates the state of FIG. 13D.

In this way, the radio base stations 10A, 10B, 10C, 10P, 10Q, and 10R configure a single radio communication system 5, which enables the radio terminals 21 and 22 to communicate through the radio base station.

As described above, in the radio communication system according to this preferred embodiment, when a plurality of radio communication systems are present and they can be connected to each other, these systems are merged into the single radio communication system. In this way, the radio terminals can communicate with a larger number of radio base stations.

Preferred embodiments of the present invention make it possible to provide an efficient communication path with radio terminals, and are applicable to radio communication systems which consume reduced electricity to maintain the configured communication path. More specifically, preferred embodiments of the present invention are applicable to radio communication base stations, mobile phone terminals, and other radio communication devices.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A radio base station for configuring a tree network with a plurality of radio base stations, the radio base station comprising:
   a terminal communicator that communicates with a radio terminal;
   a connector that, upon detecting one of the plurality of radio base stations which is waiting for connection in station-to-station communication, establishes connection with a previous hop base station which is a detected radio base station in station-to-station communication regarding the previous hop base station as a communication partner;
   a connection timing controller that, when the terminal communicator has established a communication link with the radio terminal and the connector has detected the previous hop base station, starts waiting for connection in station-to-station communication;
   a setting controller that sets path information for the radio base station; and
   a relay that, upon a next hop base station included in the plurality of base stations has started station-to-station communication with the connector and a communication path is dynamically configured or provided by sequentially setting path information for the radio station and the next hop base station, relays communication between the radio terminal or the previous hop base station and the next hop base station; wherein
   while the radio base station waits, the terminal communicator operates, and the connector and the connection timing controller do not operate;
   when the terminal communicator has established a first communication link with a first radio terminal in a state where the connection timing controller stops operating, the connection timing controller starts operating as a root in the tree network, and the relay relays communication between the first radio terminal and one of the plurality of radio base stations; and
   when the terminal communicator has established a second communication link with a second radio terminal in a state in which (i) one of the plurality of radio base stations is operating as a root and the radio base station is connected to the root radio base station, and (ii) the connection timing controller is operating, the radio base station is operating as a node in the tree network, and the relay relays communication between the second radio terminal and the root radio base station.

2. The radio base station according to claim 1, wherein, when the connector has detected a plurality of previous hop base stations, the connector selects a previous hop base station based on a predetermined condition among the plurality of previous hop base stations, and connects to the selected previous hop base station in station-to-station communication.

3. The radio base station according to claim 1, wherein the connector searches the plurality of radio base stations for a waiting radio base station among the plurality of radio base stations that is waiting for connection in a state where connection in station-to-station communication is established, and, when the connector has detected the waiting radio base station, disconnects the connection in station-to-station communication and previously presented ly connects to the detected waiting radio base station in station-to-station communication regarding the detected waiting radio base station as the previous hop base station.

4. The radio base station according to claim 1, wherein, when the first communication link between the first radio terminal and the terminal communicator is disconnected, or when the connection in station-to-station communication with the previous hop base station is disconnected, each of the plurality of radio base stations causes the connection timing controller to stop operating so as to disconnect the connection in the station-to-station communication with the next hop base station.

5. The radio base station according to claim 4, wherein, when the first communication link between the first radio terminal and the terminal communicator is disconnected, or when the second communication link is established between a terminal communicator of one of the plurality of radio base stations and the second radio terminal, a corresponding one of the plurality of radio base stations causes the connection timing controller to stop operating.

6. A radio communication system comprising:
   a plurality of the radio base stations according to claim 1; and
   a plurality of radio terminals; wherein the radio communication system configures a tree network of the plurality of base stations; and each of the plurality of radio terminals establishes a communication link with one of the plurality of radio terminals which is a root or a node in the tree network.

* * * * *